(12) United States Patent
Zhang et al.

(10) Patent No.: US 12,131,645 B1
(45) Date of Patent: Oct. 29, 2024

(54) METHODS FOR LANE CHANGING DECISION FOR VEHICLES ON EXPRESSWAYS CONSIDERING SAFETY RISKS IN A NETWORKED ENVIRONMENT

(71) Applicants: HEFEI UNIVERSITY OF TECHNOLOGY, Anhui (CN); SOUTHEAST UNIVERSITY, Nanjing (CN); HEFEI UNIVERSITY OF TECHNOLOGY DESIGN INSTITUTE (GROUP) CO., LTD, Hefei (CN)

(72) Inventors: Weihua Zhang, Hefei (CN); Yangyang Gan, Hefei (CN); Zhongxiang Feng, Hefei (CN); Zeyang Cheng, Hefei (CN); Zhibin Li, Nanjing (CN); Jian Lu, Nanjing (CN); Chun Wang, Hefei (CN); Wenjia Zhu, Hefei (CN); Heng Ding, Hefei (CN); Ye Yu, Hefei (CN); Haijian Bai, Hefei (CN)

(73) Assignees: HEFEI UNIVERSITY OF TECHNOLOGY, Hefei (CN); SOUTHEAST UNIVERSITY, Nanjing (CN); HEFEI UNIVERSITY OF TECHNOLOGY DESIGN INSTITUTE (GROUP) CO., LTD, Hefei (CN)

( * ) Notice: Subject to any disclaimer, the term of this patent is extended or adjusted under 35 U.S.C. 154(b) by 0 days.

(21) Appl. No.: 18/673,873

(22) Filed: May 24, 2024

(30) Foreign Application Priority Data

May 24, 2023 (CN) .......................... 202310592763.9

(51) Int. Cl.
G08G 1/16 (2006.01)

(52) U.S. Cl.
CPC .................................. *G08G 1/167* (2013.01)

(58) Field of Classification Search
CPC ....... B60W 30/18163; B60W 2520/10; B60W 2552/10; B60W 2554/4041;
(Continued)

(56) References Cited

U.S. PATENT DOCUMENTS

2019/0130760 A1   5/2019  Nishimura et al.
2020/0198633 A1*  6/2020  Fujimaki ......... B60W 30/18163
(Continued)

FOREIGN PATENT DOCUMENTS

CN          101089917 A      12/2007
CN          110085056 A       8/2019
(Continued)

OTHER PUBLICATIONS

Notification to Grant Patent Right for Invention in Chinese Application No. 202310592763.9 mailed on Mar. 1, 2024, 6 pages.
(Continued)

*Primary Examiner* — Abby Y Lin
*Assistant Examiner* — Hossam M Abd El Latif
(74) *Attorney, Agent, or Firm* — Porus IP LLC (57) ABSTRACT

Embodiments of the present disclosure provide a method for lane changing decision for vehicles on expressways considering safety risks in a networked environment, which is applicable to a multi-lane expressway. The method includes collecting a demand for lane change of a target vehicle; collecting a roadway and a lane where the target vehicle is located; collecting intervals between the target vehicle and a front vehicle and a rear vehicle on a lane that is switching into; determining a lane change direction of the vehicle; and executing a lane change operation by the target vehicle. A lane changing decision model provided in the embodiments of the present disclosure helps to improve the efficiency of (Continued)

lane change and the safety of lane change in expressways and provides a support for changing lanes in a multi-lane expressway.

3 Claims, 5 Drawing Sheets

(58) Field of Classification Search
CPC ..... B60W 2554/802; B60W 2554/804; B60W 2555/60; B60W 2554/408; B60W 50/14; B60W 40/02; B60W 40/105; B60W 2554/80; G08G 1/0112; G08G 1/0129; G08G 1/0133; G08G 1/0145; G08G 1/09623; G08G 1/09626; G08G 1/096716; G08G 1/096741; G08G 1/096775; G08G 1/096791; G08G 1/163; G08G 1/167
USPC .......................................................... 701/301
See application file for complete search history.

(56) References Cited

U.S. PATENT DOCUMENTS

2022/0221862 A1* 7/2022 Stein .................... G06V 20/588
2022/0410902 A1* 12/2022 Münning .............. B60W 50/10

FOREIGN PATENT DOCUMENTS

| CN | 111717199 A | 9/2020 |
| CN | 114771522 A | 7/2022 |
| CN | 115384508 A | 11/2022 |
| CN | 116001795 A | 4/2023 |
| WO | 2016159170 A1 | 10/2016 |
| WO | 2021259257 A1 | 12/2021 |

OTHER PUBLICATIONS

Bai, Haijian et al., Three-stage lane-changing trajectory planning method for automated vehicles, journal of hefei university of technology (natural science), 42(5): 577-584, 2019.

Ni, Jie et al., Safety Prediction Model of Lane Changing Based on Driver Assistance System, Journal of Transportation Systems Engineering and Information Technology, 16(4): 95-100, 2016.

Ren, Honglei et al., A Deep Learning Approach to the Citywide Traffic Accident Risk Prediction, 2018 21st International Conference on Intelligent Transportation Systems(ITSC), 2018, 6 pages.

* cited by examiner

METHODS FOR LANE CHANGING DECISION FOR VEHICLES ON EXPRESSWAYS CONSIDERING SAFETY RISKS IN A NETWORKED ENVIRONMENT

CROSS-REFERENCE TO RELATED APPLICATIONS

This application claims priority to Chinese Patent Application No. 202310592763.9, filed on May 24, 2023, the entire contents of which are incorporated herein by reference.

TECHNICAL FIELD

The present disclosure relates to the field of traffic control in an intelligent networked environment, and in particular, to methods for lane changing decision for vehicles on expressways considering safety risks in a networked environment.

BACKGROUND

With the increasing number of vehicles each year, traffic pressure is steadily increasing, and traffic safety problems are also constantly highlighted. In the driving process, when encountering situations such as a diversion zone, an end of the lane in the road ahead, a traffic accident, or in pursuit of better driving efficiency, individual characteristics, and driving experience, etc., the drivers may engage in unsafe vehicle lane changing behavior, which may easily lead to traffic congestion or even traffic accidents, reducing the efficiency of the road. In the environment of the development of vehicle cooperative technology and networked autonomous driving technology, networked vehicles equipped with on-board intelligent systems may interact with the roadside intelligent facilities, and a lane change risk factor and a lane change direction factor may be calculated according to the position of the vehicle, which improves the safety of lane changing.

SUMMARY

In response to the above problem, the present disclosure aims to provide a method for lane changing decision for vehicles on expressways considering safety risks in a networked environment, to determine a risk type of lane change of a target vehicle as well as a lane change direction of the target vehicle, to reduce traffic friction or traffic accidents between vehicle lane changes, thus improving the safety of the vehicle lane change and the road capacity.

One or more embodiments of the present disclosure provide the method for lane changing decision for vehicles on expressways considering safety risks in the networked environment. The method is applied to a unidirectional three-lane roadway in a networked environment. A deceleration lane is provided on the outermost side in a vehicular travel direction, the deceleration lane and a lane area adjacent to the deceleration lane are designated as a diversion zone, and an upstream section of the diversion zone is designated as a basic roadway. The method includes the following steps.

Step 1, the target vehicle is noted as j, the lane in which the target vehicle j is located is noted as i, a left lane in which the target vehicle j is facing the vehicular travel direction is noted as i−1, a right lane in which the target vehicle j is facing the vehicular travel direction is noted as i+1, a direct front vehicle of the target vehicle j is noted as j−1, a direct rear vehicle of the target vehicle j is noted as j+1, a left front vehicle of the target vehicle j is noted as $\overline{j-1}$, a left rear vehicle of the target vehicle j is noted as $\overline{j+1}$, a right front vehicle of the target vehicle j is noted as $\underline{j-1}$, and a right rear vehicle of the target vehicle j is noted as $\underline{j-1}$.

Step 2, a position of the target vehicle j at a moment t is collected, the position of the target vehicle j at the moment t is taken as an origin, the vehicular travel direction is taken as a positive direction of an x-axis, and a plumb line of the x-axis over the origin is taken as a y-axis to establish a coordinate system.

It is determined whether the target vehicle j is on the basic roadway at the moment t. In response to a determination that the target vehicle j is on the basic roadway, proceed to step 3; in response to a determination that the target vehicle j is not on the basic roadway, proceed to step 10.

Step 3, it is determined whether the target vehicle j at the moment t satisfies an equation (1), in response to a determination that the target vehicle j satisfies the equation (1), the target vehicle j generates a demand for lane change and proceeds to step 4; otherwise proceed to step 13.

$$[x_{i-1,\overline{j-1}}(t) > x_{i,j-1}(t) | x_{i+1,\underline{j-1}}(t) > x_{i,j-1}(t)] \&\& V_{i,j}(t) \overline{>} v_{i,j-1}(t) \quad (1)$$

In equation (1), $x_{i-1,\overline{j-1}}(t)$ denotes a position of the left front vehicle $\overline{j-1}$ of the target vehicle j on the left lane i−1 at the moment t, $x_{i,j-1}(t)$ denotes a position of the direct front vehicle j−1 of the target vehicle j on the lane i at the moment t, $x_{i+1,\underline{j-1}}(t)$ denotes a position of the right front vehicle $\underline{j-1}$ of the target vehicle j on the right lane i+1, $v_{i,j}(t)$ denotes a speed of the target vehicle j on the lane i at the moment t, and $v_{i,j-1}(t)$ denotes a speed of the direct front vehicle j−1 of the target vehicle j on the lane i at the moment t.

Step 4, it is determined whether the target vehicle j is on a middle lane of the unidirectional three-lane roadway, in response to a determination that the target vehicle j is on the middle lane of the unidirectional three-lane roadway, proceed to step 5; in response to a determination that the target vehicle j is not on the middle lane of the unidirectional three-lane roadway, proceed to step 9.

Step 5, intervals between the target vehicle j and a front vehicle and a rear vehicle on a lane that is switching into at the moment t to determine a type of lane change risk of the target vehicle j when switching lanes at the moment t and a lane change risk factor of the target vehicle j at the moment t.

If an equation (2) holds, it indicates that the target vehicle j satisfies a free-type left lane change at the moment t, and a left lane change risk factor is set as $\alpha_l = \alpha_0$, wherein $\alpha_0$ is a constant.

$$\begin{cases} \left[v_{i,j}(t) \cdot \Delta t + \frac{1}{2} a_{i,j}(t) \cdot \Delta t^2\right] - \left[v_{i-1,\overline{j-1}}(t) \cdot \Delta t + \frac{1}{2} a_{i-1,\overline{j-1}}(t) \cdot \Delta t^2\right] < \\ \qquad x_{i-1,\overline{j-1}}(t) - x_{i,j}(t) \\ \left[v_{i-1,\overline{j+1}}(t) \cdot \Delta t + \frac{1}{2} a_{i-1,\overline{j+1}}(t) \cdot \Delta t^2\right] - \left[v_{i,j}(t) \cdot \Delta t + \frac{1}{2} a_{i,j}(t) \cdot \Delta t^2\right] < \\ \qquad x_{i,j}(t) - x_{i-1,\overline{j+1}}(t) \end{cases} \quad (2)$$

In the equation (2), $a_{i,j}(t)$, $v_{i,j}(t)$, and $x_{i,j}(t)$ denote an acceleration, a speed, and a position of the target vehicle j on lane i at the moment t, respectively; $a_{i-1,\overline{j-1}}(t)$ and $v_{i-1,\overline{j-1}}(t)$ denote an acceleration and a speed of the left front vehicle $\overline{j-1}$ of the target vehicle j on the left lane i−1 at the moment t, respectively; $a_{i-1,\overline{j+1}}(t)$, $v_{i-1,\overline{j+1}}(t)$ and $x_{i-1,\overline{j+1}}(t)$ denote an acceleration, a speed and the position of the left rear vehicle $\overline{j+1}$ of the target vehicle j on the left lane i−1 at the moment t, respectively; and Δt denotes a lane change time interval.

If an equation (3) holds, it indicates that the target vehicle j satisfies a free-type right lane change at the moment t, and a right lane change risk factor is set as $\alpha_r = \alpha_0$.

$$\begin{cases} \dfrac{\left[v_{i,j}(t)\cdot\Delta t + \dfrac{1}{2}a_{i,j}(t)\cdot\Delta t^2\right] - \left[v_{i+1,\underline{j-1}}(t)\cdot\Delta t + \dfrac{1}{2}a_{i+1,\underline{j-1}}(t)\cdot\Delta t^2\right]}{x_{i+1,\underline{j-1}}(t) - x_{i,j}(t)} < \\ \dfrac{\left[v_{i+1,\underline{j+1}}(t)\cdot\Delta t + \dfrac{1}{2}a_{i+1,\underline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i+1,\underline{j+1}}(t)} < \end{cases} \quad (3)$$

In the equation (3), $\alpha_{i+1,\underline{j-1}}(t)$ and $v_{i+1,\underline{j-1}}(t)$ denote an acceleration and a speed of the right front vehicle $\underline{j-1}$ of the target vehicle j on the right lane i+1 at the moment t, respectively; $a_{i+1,\underline{j+1}}(t)$, $v_{i+1,\underline{j+1}}(t)$, and $x_{i+1,\underline{j+1}}(t)$ denote an acceleration, a speed, and a position of the right rear vehicle $\underline{j+1}$ of the target vehicle j the right lane i+1 at the moment t.

If an equation (4) holds, it indicates that the target vehicle j satisfies a low-risk type left lane change at the moment t, and the left lane change risk factor is set as $\alpha_l$, wherein $\alpha_1$ is a constant and $\alpha_0 < \alpha_1$.

$$\begin{cases} \dfrac{\left[v_{i,j}(t)\cdot\Delta t + \dfrac{1}{2}a_{i,j}(t)\cdot\Delta t^2\right] - \left[v_{i-1,\overline{j-1}}(t)\cdot\Delta t + \dfrac{1}{2}a_{i-1,\overline{j-1}}(t)\cdot\Delta t^2\right]}{x_{i-1,\overline{j-1}}(t) - x_{i,j}(t)} > \\ \dfrac{\left[v_{i-1,\overline{j+1}}(t)\cdot\Delta t + \dfrac{1}{2}a_{i-1,\overline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i-1,\overline{j+1}}(t)} < \end{cases} \quad (4)$$

If an equation (5) holds, it indicates that the target vehicle j satisfies a low-risk type right lane change at the moment t, and the right lane change risk factor is set as $\alpha_r = a_1$.

$$\begin{cases} \dfrac{\left[v_{i,j}(t)\cdot\Delta t + \dfrac{1}{2}a_{i,j}(t)\cdot\Delta t^2\right] - \left[v_{i+1,\underline{j-1}}(t)\cdot\Delta t + \dfrac{1}{2}a_{i+1,\underline{j-1}}(t)\cdot\Delta t^2\right]}{x_{i+1,\underline{j-1}}(t) - x_{i,j}(t)} > \\ \dfrac{\left[v_{i+1,\underline{j+1}}(t)\cdot\Delta t + \dfrac{1}{2}a_{i+1,\underline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i+1,\underline{j+1}}(t)} < \end{cases} \quad (5)$$

If an equation (6) holds, it indicates that the target vehicle j satisfies a medium-risk type left lane change at the moment t, and the left lane change risk factor is set as $\alpha_l = \alpha_2$, wherein $\alpha_2$ is a constant, and $\alpha_1 < \alpha_2$.

$$\begin{cases} \dfrac{\left[v_{i,j}(t)\cdot\Delta t + \dfrac{1}{2}a_{i,j}(t)\cdot\Delta t^2\right] - \left[v_{i-1,\overline{j-1}}(t)\cdot\Delta t + \dfrac{1}{2}a_{i-1,\overline{j-1}}(t)\cdot\Delta t^2\right]}{x_{i-1,\overline{j-1}}(t) - x_{i,j}(t)} < \\ \dfrac{\left[v_{i-1,\overline{j+1}}(t)\cdot\Delta t + \dfrac{1}{2}a_{i-1,\overline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i-1,\overline{j+1}}(t)} > \end{cases} \quad (6)$$

If an equation (7) holds, it indicates that the target vehicle j satisfies a medium-risk type right lane change at the moment t, and the right lane change risk factor is set as $\alpha_r = \alpha_2$.

$$\begin{cases} \dfrac{\left[v_{i,j}(t)\cdot\Delta t + \dfrac{1}{2}a_{i,j}(t)\cdot\Delta t^2\right] - \left[v_{i+1,\underline{j-1}}(t)\cdot\Delta t + \dfrac{1}{2}a_{i+1,\underline{j-1}}(t)\cdot\Delta t^2\right]}{x_{i+1,\underline{j-1}}(t) - x_{i,j}(t)} < \\ \dfrac{\left[v_{i+1,\underline{j+1}}(t)\cdot\Delta t + \dfrac{1}{2}a_{i+1,\underline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i+1,\underline{j+1}}(t)} > \end{cases} \quad (7)$$

If an equation (8) holds, it indicates that the target vehicle j does not satisfy a left lane change requirement at the moment t, and the left lane change risk factor is set as $\alpha_l = \alpha_3$, wherein $\alpha_3$ is a constant and $\alpha_2 < \alpha_3$.

$$\begin{cases} \dfrac{\left[v_{i,j}(t)\cdot\Delta t + \dfrac{1}{2}a_{i,j}(t)\cdot\Delta t^2\right] - \left[v_{i-1,\overline{j-1}}(t)\cdot\Delta t + \dfrac{1}{2}a_{i-1,\overline{j-1}}(t)\cdot\Delta t^2\right]}{x_{i-1,\overline{j-1}}(t) - x_{i,j}(t)} > \\ \dfrac{\left[v_{i-1,\overline{j+1}}(t)\cdot\Delta t + \dfrac{1}{2}a_{i-1,\overline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i-1,\overline{j+1}}(t)} > \end{cases} \quad (8)$$

If an equation (9) holds, it indicates that the target vehicle j does not satisfy a right lane change requirement at the moment t, and the right lane change risk factor is set as $\alpha_r = \alpha_3$.

$$\begin{cases} \dfrac{\left[v_{i,j}(t)\cdot\Delta t + \dfrac{1}{2}a_{i,j}(t)\cdot\Delta t^2\right] - \left[v_{i+1,\underline{j-1}}(t)\cdot\Delta t + \dfrac{1}{2}a_{i+1,\underline{j-1}}(t)\cdot\Delta t^2\right]}{x_{i+1,\underline{j-1}}(t) - x_{i,j}(t)} > \\ \dfrac{\left[v_{i+1,\underline{j+1}}(t)\cdot\Delta t + \dfrac{1}{2}a_{i+1,\underline{j+1}}(t)\cdot\Delta t^2\right] - \left[v_{i,j}(t)\cdot\Delta t + \dfrac{1}{2}a_{i,j}(t)\cdot\Delta t^2\right]}{x_{i,j}(t) - x_{i+1,\underline{j+1}}(t)} > \end{cases} \quad (9)$$

Step 6, it is determined whether the left lane change risk factor and the right lane change risk factor determined in the step 5 satisfy an equation (10), in response to a determination that the left lane change risk factor and the right lane change risk factor satisfy the equation (10), proceed to step 7; and in response to a determination that the left lane change risk factor and the right lane change risk factor do not satisfy the equation (10), proceed to the step 8.

$$\alpha_l = \alpha_r < \alpha_3 \quad (10)$$

Step 7, a left lane change direction factor $\beta_l$, and a right lane change direction factor $\beta_r$ are calculated using an equation (11), when $\beta_l \geq \beta_r$, the target vehicle j performs a left lane change and ends process at the moment t; when $\beta_l < \beta_r$, the target vehicle j performs a right lane change and ends the process at the moment t.

$$\begin{cases} \beta_l = \dfrac{x_{i,j}(t) - x_{i-1,\overline{j+1}}(t)}{x_{i-1,\overline{j-1}}(t) - x_{i-1,\overline{j+1}}(t)} \\ \beta_r = \dfrac{x_{i,j}(t) - x_{i+1,\underline{j+1}}(t)}{x_{i+1,\underline{j-1}}(t) - x_{i+1,\underline{j+1}}(t)} \end{cases} \quad (11)$$

Step 8, when $\alpha_l > \alpha_r$, the target vehicle j performs the right lane change and ends the process at the moment t; when $\alpha_l < \alpha_r$, the target vehicle j performs the left lane change and ends the process at the moment t; and when $\alpha_l = \alpha_r = \alpha_3$, step 13 is performed.

Step 9, when the target vehicle j is on the left lane or the right lane at the moment t, collecting the intervals between the target vehicle j and the front vehicle and the rear vehicle on the lane that is switching into at the moment t to determine whether the target vehicle j performs a lane changing operation at the moment t.

Step 9.1, when the target vehicle j is on the left lane at the moment t, in response to that an equation (12) holds, the target vehicle j performs the right lane change and ends the process at the moment t; otherwise, step 13 is performed.

$$\alpha_r < \alpha_3 \tag{12}$$

Step 9.2, when the target vehicle j is on the right lane at the moment t, in response to that an equation (13) holds, the target vehicle j performs the left lane change and ends the process at the moment t; otherwise, step 13 is performed.

$$\alpha_l < \alpha_3 \tag{13}$$

Step 10, when the target vehicle is in the diversion zone at the moment t, it is determined whether the target vehicle j needs to drive away from the diversion zone; when the target vehicle j needs to drive away from the diversion zone, proceed to step 11; otherwise proceed to step 12.

Step 11, when the diversion zone is located on the leftmost side of the vehicular travel direction of the target vehicle j, $\alpha_l$ is calculated according to the step 5, and then it is determined whether the equation (13) holds; in response to that the equation (13) holds, the target vehicle j performs the left lane change and ends the process at the moment t; otherwise, step 14 is performed.

When the diversion zone is located at the rightmost side of the vehicular travel direction of the target vehicle j, $\alpha_r$ is calculated according to the step 5, and then it is determined whether the equation (12) holds; in response to that the equation (12) holds, the target vehicle j performs the right lane change and ends the process at the moment t; otherwise, step 14 is performed;

Step 12, if the target vehicle j does not need to drive away from the diversion zone at the moment t, return to the step 3 for sequential execution.

Step 13, after assigning t+Δt to t, return to step 2 for sequential execution.

Step 14, after assigning t+Δt to t, in response to that an equation (14) holds, return to step 2 for sequential execution; otherwise, the target vehicle j performs a forced lane change at the moment t, which refers to vehicles affecting steering of the target vehicle j at the moment t adjusting their own speeds to force the target vehicle j to change into the diversion zone.

$$x_j(t+\Delta t) \geq x_{min} \tag{14}$$

In the equation (14), $x_j(t+\Delta t)$ denotes the position of the target vehicle j at moment t+Δt, and $x_{min}$ denotes a latest lane change position of the vehicle.

One or more embodiments of the present disclosure provide an electronic device including a memory and a processor. The memory is configured to store a program for supporting the processor to execute the method as described in the above embodiments, and the processor is configured to execute the program stored in the memory.

One or more embodiments of the present disclosure provide a computer-readable storage medium storing computer instructions. When a computer reads the computer instructions in the storage medium, the computer performs the method as described in the above embodiments.

The embodiments of the present disclosure include at least the following beneficial effects. First, the lane change risk factor and the lane change direction factor are introduced. When the target vehicle meets both left turn and right turn conditions, the lane change direction of the vehicle is determined based on the lane change risk factor. If the lane change risk factors of left turn and the right turn of the target vehicle are equal, the lane change direction of the vehicle is determined based on the lane change direction factor, thus providing the optimal choice for the vehicle to change lanes and improving the success rate of the lane change. Second, a position of the vehicle in the basic roadway or the diversion zone and the lane in which it is located are collected in real-time according to a demand for lane change. The position, speed, and acceleration of the target vehicle, and the front and the rear vehicles on a lane that is switching into, are obtained in real-time. Intervals between the position of the target vehicle on the lane that is switching into and the front vehicle and rear vehicle is calculated based on the obtained information, the risk type of lane change of the target vehicle is determined, and the risk factor is determined, thus improving the safety of the lane change of the vehicle.

BRIEF DESCRIPTION OF THE DRAWINGS

The present disclosure is further illustrated in terms of exemplary embodiments. These exemplary embodiments are described in detail with reference to according to the drawings.

These embodiments are non-limiting exemplary embodiments, in which like reference numerals represent similar structures, and wherein.

DETAILED DESCRIPTION

To more clearly illustrate the technical solutions related to the embodiments of the present disclosure, a brief introduction of the drawings referred to the description of the embodiments is provided below. The accompanying drawings do not represent the entirety of the embodiments.

It should be understood that "system", "device", "unit" and/or "module" as used herein is a manner used to distinguish different components, elements, parts, sections, or assemblies at different levels. If other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise", "comprises", "comprising", "include", "includes", and/or "including" merely prompt to include operations and elements that have been clearly identified, and these operations and elements do not constitute an exclusive listing. The methods or devices may also include other operations or elements.

When describing the operations performed in the embodiments of the present disclosure step-by-step, the order of the steps is interchangeable unless otherwise indicated, the steps may be omitted, and other steps may be included in the process of operation.

Figure 1:
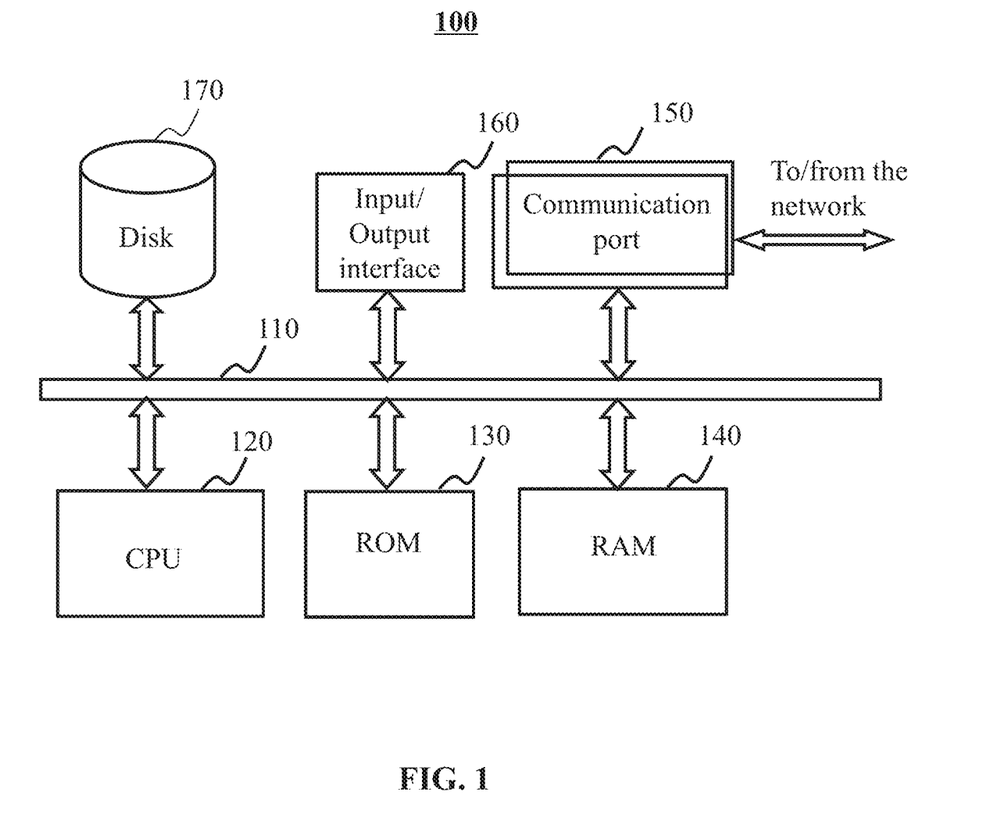
FIG. 1 is a schematic diagram illustrating exemplary hardware and software components of an exemplary electronic device according to some embodiments of the present disclosure.

FIG. 1 is a schematic diagram illustrating exemplary hardware and software components of an exemplary electronic device according to some embodiments of the present disclosure.

The electronic device 100 may be configured to perform one or more of the functions of the various modules of a vehicle lane changing decision system provided in the embodiments of the present disclosure. The vehicle lane changing decision system is a system for implementing a method for lane changing decision for vehicles on expressways considering safety risks in a networked environment.

The electronic device 100 may be a general-purpose computer or a specialized computer, both of which may be configured to implement a process for lane changing decision for vehicles on expressways considering safety risks in a networked environment. The electronic device 100 may include any component for implementing the process for lane changing decision for vehicles on expressways considering safety risks in the networked environment. Only one computer is shown in the figure for convenience, but the computer functions described in the present disclosure related to search service may be implemented in a distributed manner across a plurality of similar platforms to spread the processing load.

The electronic device 100 may include a communication port 150 that is connected to and/or from a network to enable data communication. The electronic device 100 may also include a processor 120 in the form of one or more processors for executing program instructions. The processor 120 is configured to process data from a memory or an external data source (e.g., a speed measuring device). In some embodiments, the processor 120 may include a central processing unit (CPU), an application specific integrated circuit (ASIC), an application specific instruction set processor (ASIP), or the like, or any combination thereof. The processor 120 may implement one or more functions on the electronic device 100 through its hardware, software programs, firmware, or a combination thereof.

The electronic device 100 may include an internal communication bus 110, various types of program memory and data memory (e.g., disk 170, read-only memory (ROM) 130, or random-access memory (RAM) 140), and various data files processed and/or transmitted by the computer. Exemplary computer platforms also include program instructions stored in the ROM 130, the RAM 140, and/or other forms of non-transitory storage media, which are executed by the processor 120. The method and/or the process provided by the embodiments of the present disclosure may be implemented as the program instructions.

The electronic device 100 may also include an input/output interface 160, which may support input or output between the computer and other components. The electronic device 100 may also receive programming and data via network communications.

The electronic device 100 may also include a hard disk controller in communication with a hard disk, a keypad/keyboard controller in communication with a keypad or a keyboard, a serial interface controller in communication with a serial interface device, a parallel interface controller in communication with a parallel interface device, a display controller in communication with a display, or any combination thereof.

For illustrative purposes only, only one CPU and/or processor is exemplarily described in the electronic device 100. Notably, however, the electronic device 100 provided in the embodiments of the present disclosure may include a plurality of CPUs and/or processors, and thus the operation and/or method described in the embodiments of the present disclosure that are implemented by a single CPU and/or processor described in this illustrative embodiment may also be implemented by the plurality of CPUs and/or processors, either jointly or independently. For example, in some embodiments of the present disclosure, if the CPU and/or processor of the electronic device 100 performs operation A and operation B, it should be understood that operation A and operation B may also be performed jointly or independently by two different CPUs and/or processors in the electronic device 100 (e.g., a first processor performs operation A, a second processor performs operation B, or the first and second processors jointly perform operation A and operation B).

Figure 2:
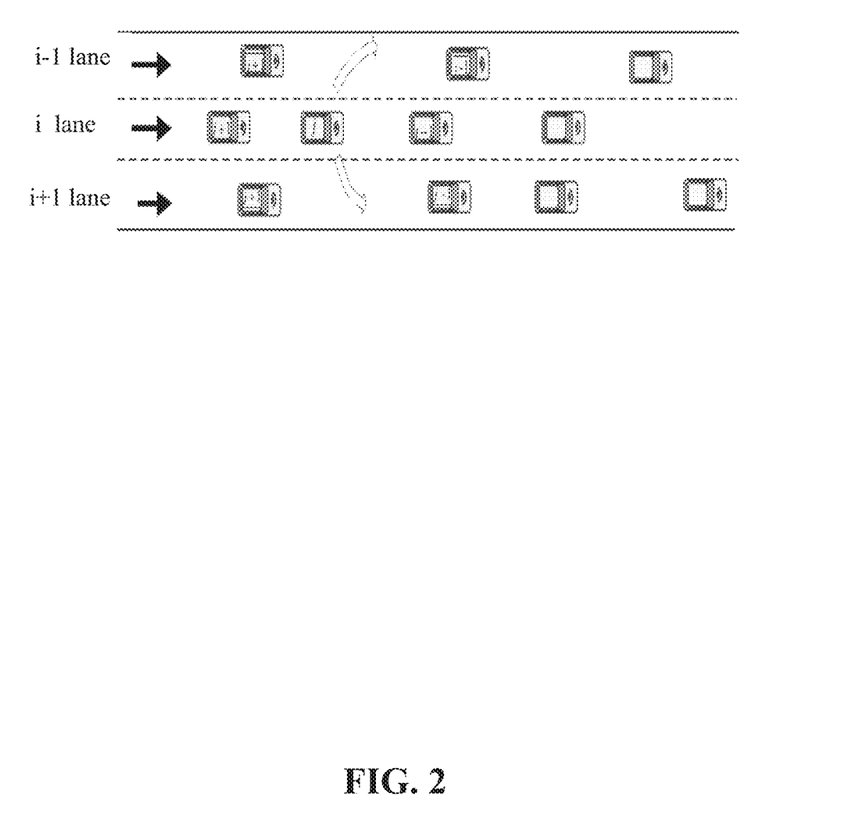
FIG. 2 is a schematic diagram illustrating a vehicle traveling in a basic roadway according to some embodiments of the present disclosure.
Figure 3:
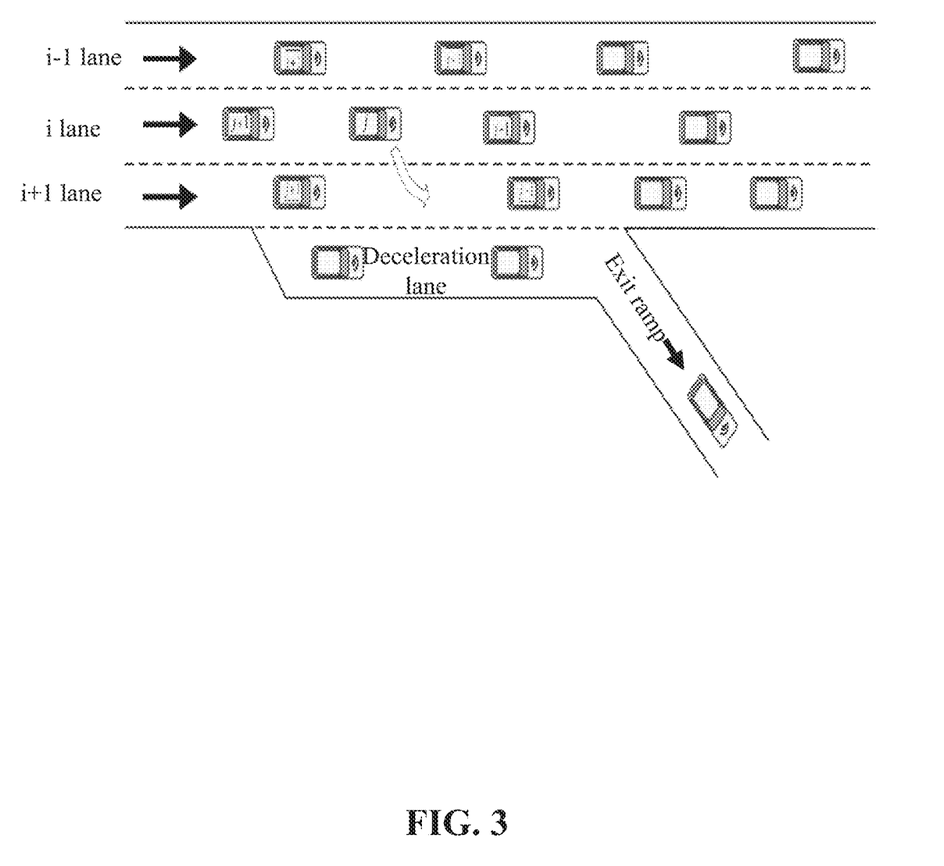
FIG. 3 is a schematic diagram illustrating a vehicle driving towards a diversion zone according to some embodiments of the present disclosure.

FIG. 2 is a schematic diagram illustrating a vehicle traveling in a basic roadway according to some embodiments of the present disclosure; and FIG. 3 is a schematic diagram illustrating a vehicle driving towards a diversion zone according to some embodiments of the present disclosure.

In some application scenarios, such as the one shown in FIG. 2, a vehicle may travel on a unidirectional three-lane roadway, and a vehicular travel direction is from left to right. The unidirectional three-lane roadway includes a middle lane i that is in the middle of the three lanes, a left lane i−1 on a left side of the middle lane i along the vehicular travel direction, and a right lane i+1 on a right side of the middle lane i along the vehicular travel direction.

A vehicle refers to a networked vehicle. Networked vehicle means vehicles are capable of communicating with each other and may be interconnected with intelligent transportation devices on the road to obtain real-time road information.

It is assumed that in a networked environment, vehicles travel on the unidirectional three-lane roadway or a diversion zone and execute a lane change on the unidirectional three-lane roadway or the diversion zone.

In other application scenarios, a method for lane changing decision for vehicles on expressways considering safety risks in a networked environment may be applied to a unidirectional four-lane roadway. For example, a vehicle is traveling on the unidirectional four-lane roadway, at which point the method for lane changing decision for vehicles on expressways may consider the vehicle traveling and changing lanes on the unidirectional four-lane roadway or the diversion zone.

Figure 4:
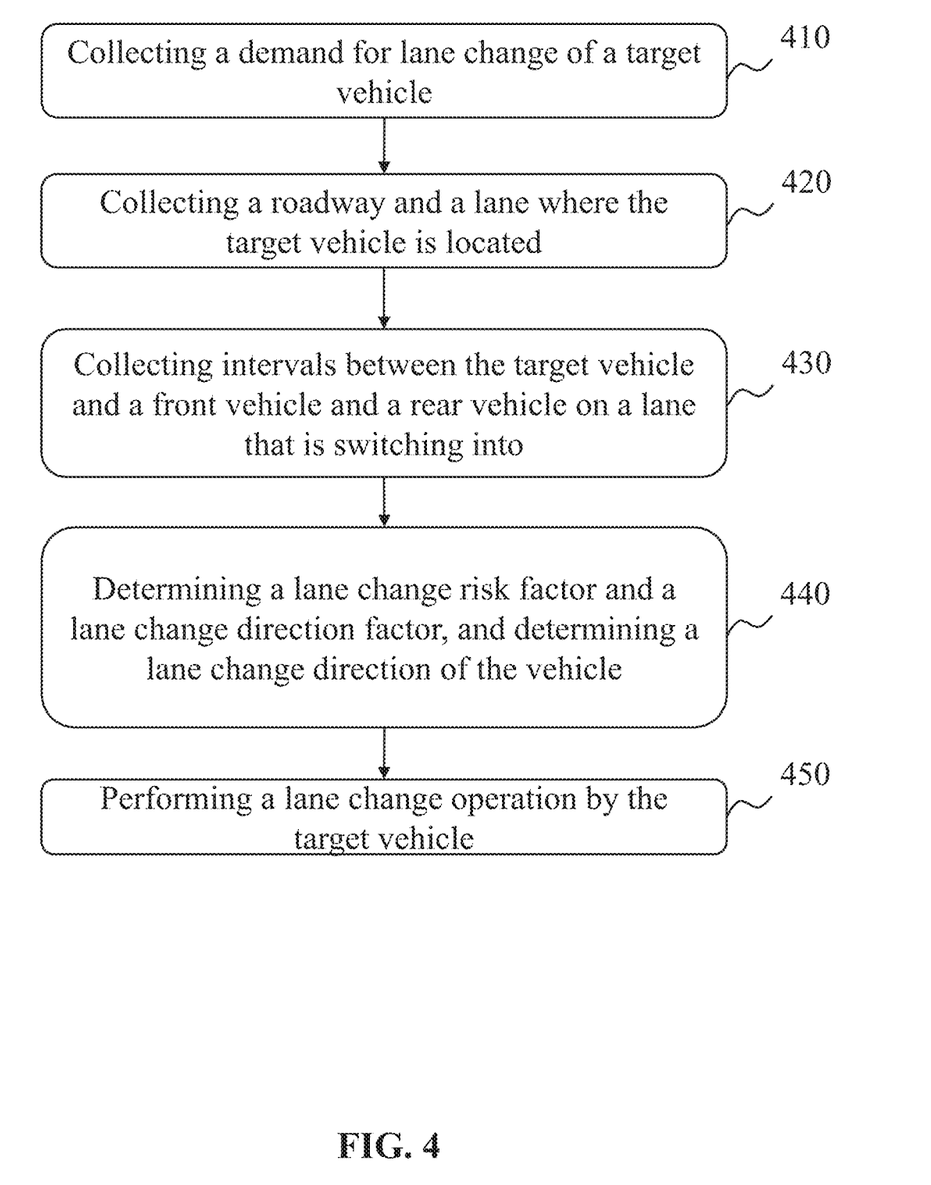
FIG. 4 is a flowchart illustrating an exemplary method for lane changing decision for vehicles on expressways considering safety risks in a networked environment according to some embodiments shown in the present disclosure.

FIG. 4 is a flowchart illustrating an exemplary method for lane changing decision for vehicles on expressways considering safety risks in a networked environment according to some embodiments in the present disclosure. In some embodiments, in the method for lane changing decision for vehicles on expressways considering safety risks in the networked environment, various steps of the method may be performed by a processor in an electronic device.

In 410, a demand for lane change of a target vehicle is collected.

The target vehicle refers to a vehicle that currently needs a lane change. The demand for lane change of the target vehicle refers to a request message sent by the target vehicle based on a demand to change lanes. The demand for lane change of the target vehicle may include having a demand for lane change or no demand for lane change.

In some embodiments, the target vehicle may send the demand for lane change to the processor in a plurality of ways. For example, the target vehicle may send the demand for lane change to the processor via a central control platform configured on the target vehicle. As another example, the driver of the target vehicle may send the demand for lane change to the processor via a terminal device. The terminal device may include a smartphone, etc.

In some embodiments, the processor may determine whether there is a demand for lane change of the target vehicle based on positional information and speed information of nearby vehicles of the target vehicle. Descriptions regarding the embodiment may be found in related descriptions in step S101.

After the processor has executed step 410, it proceeds to step 420.

In 420, a roadway and a lane where the target vehicle is located are collected.

In some embodiments, the processor may collect a position of the target vehicle j at a moment t, establish a coordinate system with the position of the target vehicle j at the moment t as an origin, a vehicular travel direction as a positive direction of an x-axis, and a plumb line of the x-axis over the origin as a y-axis.

In some embodiments, the processor may collect a position, a speed, and an acceleration of a vehicle on the roadway via a smart networked roadside facility. The smart networked roadside facility a roadside facility that are capable of communicating with a networked autonomous vehicle, such as a video camera, a rangefinder, a lidar, a millimeter-wave radar, or the like. The video camera is configured to capture road-related images. The rangefinder is configured to measure a distance between two vehicles on the road. The lidar and the millimeter-wave radar are configured to detect the position, the speed, and the acceleration of the vehicle on the roadway.

In some embodiments, a deceleration lane is provided at the outermost side of the unidirectional three-lane roadway along the vehicular travel direction, which extends to an exit ramp, as shown in FIG. 3. The deceleration lane and a lane area adjacent to the deceleration lane are designated as a diversion zone, and an upstream section of the diversion zone is designated as a basic roadway.

In some embodiments, the processor may capture road images of the diversion zone and the basic roadway with a camera, and select a road image of the position of the target vehicle based on the position of the target vehicle.

In some embodiments, the processor may determine whether the target vehicle is in a diversion zone or a basic roadway based on the road image of the position of the target vehicle. For example, in response to the road image of the position of the target vehicle is a road image of the unidirectional three-lane roadway, the processor may determine that the target vehicle is in the basic roadway. In response to the road image of the position of the target vehicle is the road image of the deceleration lane and the lane area adjacent to the deceleration lane, the processor may determine that the target vehicle is in the diversion zone.

In some embodiments, the processor may obtain the position of the target vehicle via the smart networked roadside facility and determine the position of the target vehicle j on the unidirectional three-lane roadway by comparing it with a road image captured by the camera. For example, in response to the position of the target vehicle falling within a range of a middle lane in the road image, the processor may determine that the target vehicle is in the middle lane of the unidirectional three-lane roadway.

It should be noted that when the section of roadway and/or the lane where the target vehicle is located is of a different type, there are different manners for determining the lane change risk factor, lane change direction factor, and the manner for determining a lane change direction of the target vehicle.

In some embodiments, the processor may designate the target vehicle as j, a lane in which the target vehicle j is located as i, a left lane in which the target vehicle j is facing the vehicular travel direction as i−1, a right lane in which the target vehicle j is facing the vehicular travel direction as i+1, a direct front vehicle of the target vehicle j as j−1, a direct rear vehicle of the target vehicle j as j+1, a left front vehicle of the target vehicle j as $\overline{j-1}$, a left rear vehicle of the target vehicle j as $\overline{j+1}$, a right front vehicle of the target vehicle j as $\underline{j-1}$, and a right rear vehicle of the target vehicle j as $\underline{j+1}$.

In some embodiments, the processor may determine whether the target vehicle j is on the basic roadway at the moment t. If the target vehicle j is on the basic roadway, the processor may enter sub-process S1; if the target vehicle j is not on the basic roadway (i.e., the target vehicle j is in the diversion zone), the processor enters sub-process S2.

When the target vehicle j is on the basic roadway, the processor may determine a lane change risk factor, a lane change direction factor, and a lane change direction of the target vehicle j by sub-process S1. In some embodiments, the sub-process S1 may include steps S101-S102.

In S101, the processor may determine whether there is a demand for lane change for the target vehicle j at the moment t by an equation (1). If the target vehicle j satisfies the equation (1) at the moment t, the target vehicle j generates the demand for lane change and proceeds to S102; otherwise, proceeds to S443.

$$[x_{i-1,\overline{j-1}}(t) > x_{i,j-1}(t) | x_{i+1,\underline{j-1}}(t) > x_{i,j-1}(t)] \&\& V_{i,j}(t) > \overline{v_{i,j-1}}(t) \quad (1)$$

In equation (1), $x_{i-1,\overline{j-1}}(t)$ denotes a position of the left front vehicle $\overline{j-1}$ of the target vehicle j on the left lane i−1 at the moment t, $x_{i,j-1}(t)$ denotes a position of the direct front vehicle j−1 of the target vehicle j on the lane i at the moment t, $x_{i+1,\underline{j-1}}(t)$ denotes a position of the right front vehicle $\underline{j-1}$ of the target vehicle j on the right lane i+1, $v_{i,j}(t)$ denotes a speed of the target vehicle j on the lane i at the moment t, and $v_{i,j-1}(t)$ denotes a speed of the direct front vehicle j−1 of the target vehicle j on the lane i at the moment t.

In S102, it is determined whether the target vehicle j is on the middle lane of the unidirectional three-lane roadway; if the target vehicle j is on the middle lane of the unidirectional three-lane roadway, the processor proceeds sequentially to step 430 and step 440; and if the target vehicle j is not on the middle lane of the unidirectional three-lane roadway, the processor proceeds sequentially to step 430 and sub-process S3.

When the target vehicle j is in the diversion zone, the processor may determine the lane change risk factor, the lane change direction factor, and the lane change direction of the target vehicle j by sub-process S2. In some embodiments, sub-process S2 may include steps S201-S202.

In S201, in response to the target vehicle j being in the diversion zone, it is determined whether the target vehicle j needs to drive away from the diversion zone. If the target vehicle j needs to drive away from the diversion zone at the moment t, the processor enters step S202; if the target vehicle j does not need to drive away from the diversion zone at the moment t, the processor returns to the sub-process S1 for sequential execution.

In some embodiments, based on the demand for lane change of the target vehicle, the processor may determine whether the target vehicle j needs to drive away from the diversion zone. For example, if there is a demand for lane change of the target vehicle, which includes changing lanes to the basic roadway, the processor may determine that the target vehicle j needs to drive away from the diversion zone. As another example, if there is no demand for lane change of the target vehicle, the processor may determine that the target vehicle j does not need to drive away from the diversion zone.

In S202, based on an orientation of the diversion zone with respect to the vehicular travel direction of the target vehicle j, the lane change risk factor, the lane change direction factor, and the lane change direction of the target vehicle j are determined.

Figure 5:
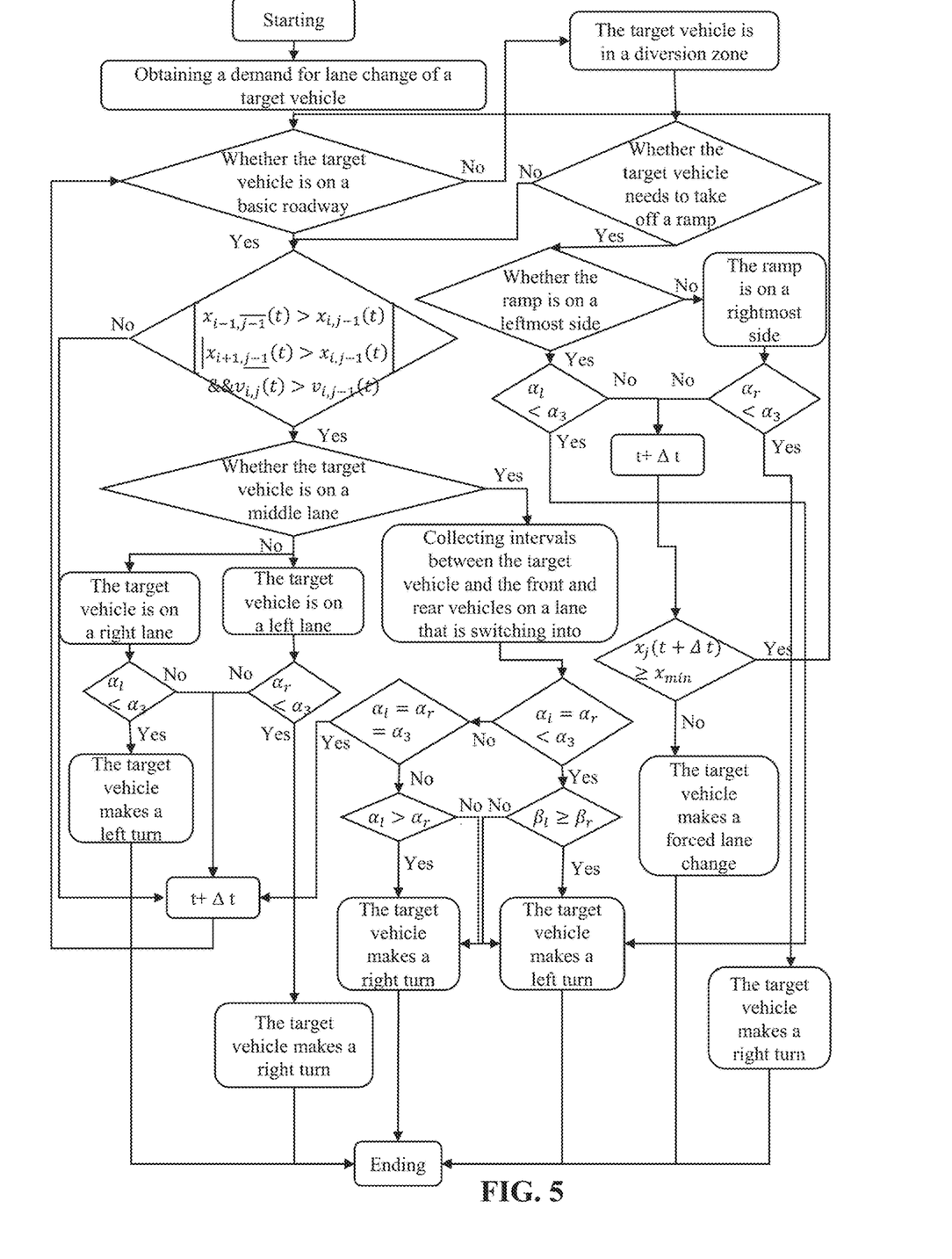
FIG. 5 is a schematic diagram illustrating a method for lane changing decision for vehicles on expressways considering safety risks in a networked environment according to some embodiments shown in the present disclosure.

As shown in FIG. 4 and FIG. 5, if the diversion zone is located on the leftmost side of the vehicular travel direction of the target vehicle j, the processor may calculate a left lane change risk factor $\alpha_l$ according to steps 430 and 440, and then determine whether an equation (13) holds; if the equation (13) holds, the processor may determine that the target vehicle j performs a left lane change at the moment t and ends the process; otherwise, step 444 is performed.

As shown in FIG. 4 and FIG. 5, if the diversion zone is located on the rightmost side of the vehicular travel direction of the target vehicle j, the processor may calculate the right lane change risk factor $\alpha_r$ according to steps 430 and 440, and then determine whether an equation (12) holds; if the equation (12) holds, the processor may determine that the target vehicle j performs a right lane change at the moment t and ends the process; otherwise, step 444 is performed.

When the target vehicle j is on the basic roadway at the moment t and not in the middle lane of the unidirectional three-lane roadway at the moment t (e.g., the target vehicle j is on the left lane or the right lane at the moment t), the processor may determine the lane change risk factor, the lane change direction factor, and the lane change direction of the target vehicle j through steps 430 and the sub-process S3. In some embodiments, the sub-process S3 may include steps S301-S302.

In S301, in response to the target vehicle j being on the left lane at the moment t, if the equation (12) holds, the processor may determine that the target vehicle j performs the right lane change at the moment t and end the process; otherwise, step 443 is performed.

$$\alpha_r < \alpha_3 \qquad (12)$$

In S302, in response to the target vehicle j being on the right lane at the moment t, if equation (13) holds, the processor may determine that the target vehicle j performs the left lane change at the moment t and ends the process; otherwise, step 443 is performed.

$$\alpha_l < \alpha_3 \qquad (13)$$

In 430, intervals between the target vehicle and a front vehicle and a rear vehicle on a lane that is switching into are collected.

In some embodiments, the processor may collect, via a rangefinder, intervals between the target vehicle j and a front vehicle and a rear vehicle on a lane that is switching into at the moment t.

After the processor has executed step 430, it proceeds to step 440.

In 440, the lane change risk factor and the lane change direction factor $\alpha$ re determined, and the lane change direction of the vehicle is determined.

In some embodiments, the processor may determine, based on a position, a speed, and an acceleration of the target vehicle j at the moment t, and positions, speeds, and accelerations of the front vehicle and the rear vehicle on the lane where the target vehicle is switching into at the moment t, a type of lane change risk when the target vehicle j switches lanes at the moment t, and obtain the lane change risk factor of the target vehicle j at the moment t.

The type of lane change risk may be categorized into a free-type, a low-risk type, and a medium-risk type based on the safety risks faced by the vehicle, and safety factors of the three types of lane change are reduced in turn. In a free-type lane change, the intervals between the target vehicle and the front vehicle and the rear vehicle on the lane where the target vehicle is switching into are large enough, the target vehicle may neither rear-end the front vehicle nor be rear-ended by the rear vehicle. In a low-risk type lane change, the interval between the target vehicle and the rear vehicle on the lane where the target vehicle is switching into is large enough, but the interval between the target vehicle and the front vehicle on the lane where the target vehicle is switching into is small, then there is a risk of rear end collision with the front vehicle. In a medium-risk type lane change, the interval between the target vehicle and the front vehicle on the lane where the target vehicle is switching into is large enough, but the interval between the target vehicle and the rear vehicle on the lane where the target vehicle is switching into is small, there is a risk of being rear ended by the rear vehicle. Further, if both low-risk type lane change and medium-risk type lane change exist, the intervals between the target vehicle and the front and rear vehicle on the lane where the target vehicle is switching into is small, and the lane change condition is not satisfied.

In some embodiments, the processor may determine the type of lane change risk when the target vehicle j changes the lane at the moment t by equations (2)-(9) and obtain a lane change risk factor of the target vehicle j at the moment t.

If the equation (2) holds, it indicates that the target vehicle j satisfies a free-type left lane change at the moment t, and a left lane change risk factor is set as $\alpha_l = \alpha_0$, where $\alpha_0$ is a constant.

$$\begin{cases} \left[ v_{i,j}(t) \cdot \Delta t + \frac{1}{2} a_{i,j}(t) \cdot \Delta t^2 \right] - \left[ v_{i-1,\overline{j-1}}(t) \cdot \Delta t + \frac{1}{2} a_{i-1,\overline{j-1}}(t) \cdot \Delta t^2 \right] < \\ \qquad x_{i-1,\overline{j-1}}(t) - x_{i,j}(t) \\ \left[ v_{i-1,\overline{j+1}}(t) \cdot \Delta t + \frac{1}{2} a_{i-1,\overline{j+1}}(t) \cdot \Delta t^2 \right] - \left[ v_{i,j}(t) \cdot \Delta t + \frac{1}{2} a_{i,j}(t) \cdot \Delta t^2 \right] < \\ \qquad x_{i,j}(t) - x_{i-1,\overline{j+1}}(t) \end{cases} \qquad (2)$$

In the equation (2), $a_{i,j}(t)$, $v_{i,j}(t)$, and $x_{i,j}(t)$ denote an acceleration, a speed, and a position of the target vehicle j on the lane i at the moment t, respectively; $a_{i-1,\overline{j-1}}(t)$ and $v_{i-1,\overline{j-1}}(t)$ denote an acceleration and a speed of the left front vehicle $\overline{j-1}$ of the target vehicle j on the left lane i−1 at the moment t, respectively; $a_{i-1,\overline{j+1}}(t)$, $v_{i-1,\overline{j+1}}(t)$ and $x_{i-1,\overline{j+1}}(t)$ denote an acceleration, a speed and the position of the left rear vehicle j+1 of the target vehicle j on the left lane i−1 at the moment t, respectively; and $\Delta t$ denotes a lane change time interval; the lane change time interval is a duration of lane change.

If the equation (3) holds, it indicates that the target vehicle j satisfies a free-type right lane change at the moment t, and the right lane change risk factor is set as $\alpha_r=\alpha_0$.

$$\begin{cases} \left[v_{i,j}(t)\cdot \Delta t + \frac{1}{2}a_{i,j}(t)\cdot \Delta t^2\right] - \left[v_{i+1,\underline{j-1}}(t)\cdot \Delta t + \frac{1}{2}a_{i+1,\underline{j-1}}(t)\cdot \Delta t^2\right] < \\ \quad x_{i+1,\underline{j-1}}(t) - x_{i,j}(t) \\ \left[v_{i+1,\underline{j+1}}(t)\cdot \Delta t + \frac{1}{2}a_{i+1,\underline{j+1}}(t)\cdot \Delta t^2\right] - \left[v_{i,j}(t)\cdot \Delta t + \frac{1}{2}a_{i,j}(t)\cdot \Delta t^2\right] < \\ \quad x_{i,j}(t) - x_{i+1,\underline{j+1}}(t) \end{cases} \quad (3)$$

In the equation (3), $a_{i+1,j-1}(t)$ and $v_{i+1,j-1}(t)$ denote an acceleration and a speed of the right front vehicle $\underline{j-1}$ of the target vehicle j on the right lane i+1 at the moment t, respectively; $a_{i+1,j+1}(t)$, $v_{i+1,j+1}(t)$ and $x_{i+1,j+1}(t)$ denote an acceleration, a speed and a position of the right rear vehicle $\underline{j+1}$ of the target vehicle j on the right lane i+1 at the moment t, respectively.

If the equation (4) holds, it indicates that the target vehicle j satisfies a low-risk type left lane change at the moment t, and the left lane change risk factor is set as $\alpha_l=\alpha_1$, where $\alpha_1$ is a constant and $\alpha_0<\alpha_1$.

$$\begin{cases} \left[v_{i,j}(t)\cdot \Delta t + \frac{1}{2}a_{i,j}(t)\cdot \Delta t^2\right] - \left[v_{i-1,\overline{j-1}}(t)\cdot \Delta t + \frac{1}{2}a_{i-1,\overline{j-1}}(t)\cdot \Delta t^2\right] > \\ \quad x_{i-1,\overline{j-1}}(t) - x_{i,j}(t) \\ \left[v_{i-1,\overline{j+1}}(t)\cdot \Delta t + \frac{1}{2}a_{i-1,\overline{j+1}}(t)\cdot \Delta t^2\right] - \left[v_{i,j}(t)\cdot \Delta t + \frac{1}{2}a_{i,j}(t)\cdot \Delta t^2\right] < \\ \quad x_{i,j}(t) - x_{i-1,\overline{j+1}}(t) \end{cases} \quad (4)$$

If the equation (5) holds, it indicates that the target vehicle j satisfies a low-risk type right lane change at the moment t, and the right lane change risk factor is set as $\alpha_r=a_1$.

$$\begin{cases} \left[v_{i,j}(t)\cdot \Delta t + \frac{1}{2}a_{i,j}(t)\cdot \Delta t^2\right] - \left[v_{i+1,\underline{j-1}}(t)\cdot \Delta t + \frac{1}{2}a_{i+1,\underline{j-1}}(t)\cdot \Delta t^2\right] > x_{i+1,\overline{j-1}}(t) - x_{i,j}(t) \\ \left[v_{i+1,\underline{j+1}}(t)\cdot \Delta t + \frac{1}{2}a_{i+1,\underline{j+1}}(t)\cdot \Delta t^2\right] - \left[v_{i,j}(t)\cdot \Delta t + \frac{1}{2}a_{i,j}(t)\cdot \Delta t^2\right] < x_{i,j}(t) - x_{i+1,\underline{j+1}}(t) \end{cases} \quad (5)$$

If the equation (6) holds, it indicates that the target vehicle j satisfies a medium-risk type left lane at the moment t. The left lane change risk factor is set as $\alpha_l=\alpha_2$, where $\alpha_2$ is a constant and $\alpha_1<\alpha_2$.

$$\begin{cases} \left[v_{i,j}(t)\cdot \Delta t + \frac{1}{2}a_{i,j}(t)\cdot \Delta t^2\right] - \left[v_{i-1,\overline{j-1}}(t)\cdot \Delta t + \frac{1}{2}a_{i-1,\overline{j-1}}(t)\cdot \Delta t^2\right] < x_{i-1,\overline{j-1}}(t) - x_{i,j}(t) \\ \left[v_{i-1,\overline{j+1}}(t)\cdot \Delta t + \frac{1}{2}a_{i-1,\overline{j+1}}(t)\cdot \Delta t^2\right] - \left[v_{i,j}(t)\cdot \Delta t + \frac{1}{2}a_{i,j}(t)\cdot \Delta t^2\right] > x_{i,j}(t) - x_{i-1,\overline{j+1}}(t) \end{cases} \quad (6)$$

If the equation (7) holds, it indicates that the target vehicle j at the moment t satisfies a medium-risk type right lane and the right lane change risk factor is set as $\alpha_r=\alpha_2$.

$$\begin{cases} \left[v_{i,j}(t)\cdot \Delta t + \frac{1}{2}a_{i,j}(t)\cdot \Delta t^2\right] - \left[v_{i+1,\underline{j-1}}(t)\cdot \Delta t + \frac{1}{2}a_{i+1,\underline{j-1}}(t)\cdot \Delta t^2\right] < x_{i+1,\underline{j-1}}(t) - x_{i,j}(t) \\ \left[v_{i+1,\underline{j+1}}(t)\cdot \Delta t + \frac{1}{2}a_{i+1,\underline{j+1}}(t)\cdot \Delta t^2\right] - \left[v_{i,j}(t)\cdot \Delta t + \frac{1}{2}a_{i,j}(t)\cdot \Delta t^2\right] > x_{i,j}(t) - x_{i+1,\underline{j+1}}(t) \end{cases} \quad (7)$$

If the equation (8) holds, it indicates that the target vehicle j does not satisfy a left lane change requirement at the moment t, and the left lane change risk factor is set as $\alpha_l=\alpha_3$, where $\alpha_3$ is a constant and $\alpha_2<\alpha_3$.

$$\begin{cases} \left[v_{i,j}(t)\cdot \Delta t + \frac{1}{2}a_{i,j}(t)\cdot \Delta t^2\right] - \left[v_{i-1,\overline{j-1}}(t)\cdot \Delta t + \frac{1}{2}a_{i-1,\overline{j-1}}(t)\cdot \Delta t^2\right] > x_{i-1,\overline{j-1}}(t) - x_{i,j}(t) \\ \left[v_{i-1,\overline{j+1}}(t)\cdot \Delta t + \frac{1}{2}a_{i-1,\overline{j+1}}(t)\cdot \Delta t^2\right] - \left[v_{i,j}(t)\cdot \Delta t + \frac{1}{2}a_{i,j}(t)\cdot \Delta t^2\right] > x_{i,j}(t) - x_{i-1,\overline{j+1}}(t) \end{cases} \quad (8)$$

If the equation (9) holds, then it indicates that the target vehicle j does not satisfy a right lane change requirement at the moment t, and the right lane change risk factor is set as $\alpha_r=\alpha_3$.

$$\begin{cases} \left[v_{i,j}(t)\cdot\Delta t + \frac{1}{2}a_{i,j}(t)\cdot\Delta t\right] - \left[v_{i+1,\overline{j-1}}(t)\cdot\Delta t + \frac{1}{2}a_{i+1,\overline{j-1}}(t)\cdot\Delta t\right] > x_{i+1,\overline{j-1}}(t) - x_{i,j}(t) \\ \left[v_{i+1,\overline{j+1}}(t)\cdot\Delta t + \frac{1}{2}a_{i+1,\overline{j+1}}(t)\cdot\Delta t\right] - \left[v_{i,j}(t)\cdot\Delta t + \frac{1}{2}a_{i,j}(t)\cdot\Delta t\right] > x_{i,j}(t) - x_{i+1,\overline{j+1}}(t) \end{cases} \quad (9)$$

As shown in FIG. 5, when the target vehicle at the moment t satisfies both left turn and the right turn conditions, and when the target vehicle j at the moment t has a left lane change risk factor $\alpha_l$ the same as a right lane change risk factor $\alpha_r$, the processor may determine whether the left lane change risk factor $\alpha_l$ and the right lane change risk factor $\alpha_r$ satisfy an equation (10).

$$\alpha_l=\Delta_r<\alpha_3 \quad (10)$$

If the left lane change risk factor $\alpha_l$ and the right lane change risk factor $\alpha_r$ satisfy the equation (10), then the processor enters step 441, otherwise, the processor enters step 442. The target vehicle satisfying both the left turn and the right turn conditions indicates that the safety risk faced by the target vehicle is one of the free type, the low-risk type, and the medium-risk type, i.e., at least one of the above equations (2) to (7) holds and the equations (8) to (9) do not hold.

In 441, a left lane change direction factor $\beta_l$, and a right lane change direction factor $\beta_r$ are calculated.

In some embodiments, the processor may use equation (11) to calculate the left lane change direction factor $\beta_l$, and the right lane change direction factor $\beta_r$, and determine the lane change direction of the vehicle based on the left lane change direction factor $\beta_l$, and the right lane change direction factor $\beta_r$.

$$\begin{cases} \beta_l = \dfrac{x_{i,j}(t) - x_{i-1,\overline{j+1}}(t)}{x_{i-1,\overline{j-1}}(t) - x_{i-1,\overline{j+1}}(t)} \\ \beta_r = \dfrac{x_{i,j}(t) - x_{i+1,\overline{j+1}}(t)}{x_{i+1,\overline{j-1}}(t) - x_{i+1,\overline{j+1}}(t)} \end{cases} \quad (11)$$

In some embodiments, in response to $\beta_l>\beta_r$, the processor may determine that the target vehicle j performs the left lane change at the moment t, then proceed to step 450 and end the process. In response to $\beta_l<\beta_r$, the processor may determine that the target vehicle j performs the right lane change at the moment t, then proceed to step 450 and end the process.

In 442, the lane change direction of the vehicle is determined based on the left lane change risk factor $\alpha_l$ and the right lane change risk factor $\alpha_r$.

In some embodiments, in response to $\alpha_l>\alpha_r$, the processor may determine that the target vehicle j performs the right lane change at the moment t, then proceed to step 450 and end the process.

In some embodiments, in response to $\alpha_l<\alpha_r$, the processor may determine that the target vehicle j performs the left lane change at the moment t, then proceed to step 450 and end the process.

In some embodiments, in response to $\alpha_l=\alpha_r=\alpha_3$, the processor may return to perform step 443.

In 443, after assigning t+Δt to t, the processor returns to step 420 and execute in sequence.

In 444, it is determined whether the target vehicle performs a forced lane change.

As shown in FIG. 4 and FIG. 5, after assigning t+Δt to t, the processor may use an equation (14) to determine whether the target vehicle performs the forced lane change. If the equation (14) holds, the processor returns to step 420 and executes in sequence; otherwise, the processor may determine that the target vehicle j performs the forced lane change at the moment t and proceeds to step 450. A forced lane change indicates that the vehicle influencing the steering of the target vehicle j at the moment t adjusts its own speed to prompt the target vehicle j to change into the diversion zone.

$$x_j(t+\Delta t)>x_{min} \quad (14)$$

In the equation (14), $x_1(t+\Delta t)$ denotes the position of the target vehicle j at a moment t+Δt, and $x_{min}$ denotes a latest lane change position of the vehicle.

In 450, the target vehicle performs a lane change operation.

In some embodiments, the target vehicle may perform the lane change operation based on the lane change direction determined at step 440.

It should be noted that all of the above processes for determining the relevant data using the equations are performed by the processor. For example, the equations may be stored in a memory in advance in the form of program instructions. The processor may retrieve the relevant program instructions in the memory to implement the methods and/or processes provided by the embodiments of the present disclosure.

In some embodiments of the present disclosure, the method for lane changing decision for vehicles on expressways considering safety risks in the networked environment is not limited to making a decision on changing lanes of a vehicle on the unidirectional three-lane roadway. Other embodiments obtained by a person of ordinary skill in the art without creative changes fall within the scope of the present disclosure.

In addition, certain features, structures, or characteristics of one or more embodiments of the present disclosure may be suitably combined.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

In the event of any inconsistency or conflict between the descriptions, definitions, and/or the use of terms in the materials cited in this disclosure and those described in the present disclosure, the descriptions, definitions, and/or the use of terms in the present disclosure shall prevail.

What is claimed is:

1. A method for lane changing decision for vehicles on expressways considering safety risks in a networked environment, wherein the method is applied to a unidirectional three-lane roadway in the networked environment, a deceleration lane is provided on an outermost side in a vehicular travel direction; and the deceleration lane and a lane area adjacent to the deceleration lane are designated as a diversion zone, an upstream section of the diversion zone is designated as a basic roadway, and the method comprises:

step 1, noting a target vehicle as j, noting a lane in which the target vehicle j is located as i, noting a left lane in which the target vehicle j is facing the vehicular travel direction as i−1, noting a right lane in which the target vehicle j is facing the vehicular travel direction as i+1, noting a direct front vehicle of the target vehicle j as j−1, noting a direct rear vehicle of the target vehicle j as j+1, noting a left front vehicle of the target vehicle j as $\overline{j-1}$, noting a left rear vehicle of the target vehicle j as $\overline{j+1}$, noting a right front vehicle of the target vehicle j as $\underline{j-1}$, and noting a right rear vehicle of the target vehicle j as $\underline{j+1}$;

step 2, collecting a position of the target vehicle j at a moment t, taking the position of the target vehicle j at the moment t as an origin, taking the vehicular travel direction as a positive direction of an x-axis, and making a plumb line of the x-axis over the origin as a y-axis to establish a coordinate system; and determining whether the target vehicle j is on the basic roadway at the moment t, in response to a determination that the target vehicle j is on the basic roadway, proceeding to step 3; in response to a determination that the target vehicle j is not on the basic roadway, proceeding to step 10;

step 3, determining whether the target vehicle j at the moment t satisfies an equation (1), in response to a determination that the target vehicle j satisfies the equation (1), the target vehicle j generating a demand for lane change and proceeding to step 4; otherwise proceeding to step 13;

$$[x_{i-1,\overline{j-1}}(t) > x_{i,j-1}(t) | x_{i+1,\underline{j-1}}(t) > x_{i,j-1}(t)] \&\& V_{i,j}(t) > v_{i,j-1}(t) \quad (1)$$

wherein $x_{i-1,\overline{j-1}}(t)$ denotes a position of the left front vehicle $\overline{j-1}$ of the target vehicle j on the left lane i−1 at the moment t, $x_{i,j-1}(t)$ denotes a position of the direct front vehicle j−1 of the target vehicle j on the lane i at the moment t, $x_{i+1,\underline{j-1}}(t)$ denotes a position of the right front vehicle $\underline{j-1}$ of the target vehicle j on the right lane i+1, $v_{i,1}(t)$ denotes a speed of the target vehicle j on the lane i at the moment t, and $v_{i,j-1}(t)$ denotes a speed of the direct front vehicle j−1 of the target vehicle j on the lane i at the moment t;

step 4, determining whether the target vehicle j is on a middle lane of the unidirectional three-lane roadway, in response to a determination that the target vehicle j is on the middle lane of the unidirectional three-lane roadway, proceeding to step 5; in response to a determination that the target vehicle j is not on the middle lane of the unidirectional three-lane roadway, proceeding to step 9;

step 5, collecting intervals between the target vehicle j and a front vehicle and a rear vehicle on a lane that is switching into at the moment t to determine a type of lane change risk of the target vehicle j when switching lanes at the moment t and obtain a lane change risk factor of the target vehicle j at the moment t; wherein if an equation (2) holds, it indicates that the target vehicle j satisfies a free-type left lane change at the moment t, and a left lane change risk factor is $\alpha_l = \alpha_0$, wherein $\alpha_0$ is a constant;

$$\begin{cases} \left[v_{i,j}(t) \cdot \Delta t + \frac{1}{2} a_{i,j}(t) \cdot \Delta t^2\right] - \left[v_{i-1,\overline{j-1}}(t) \cdot \Delta t + \frac{1}{2} a_{i-1,\overline{j-1}}(t) \cdot \Delta t^2\right] < x_{i-1,\overline{j-1}}(t) - x_{i,j}(t) \\ \left[v_{i-1,\overline{j+1}}(t) \cdot \Delta t + \frac{1}{2} a_{i-1,\overline{j+1}}(t) \cdot \Delta t^2\right] - \left[v_{i,j}(t) \cdot \Delta t + \frac{1}{2} a_{i,j}(t) \cdot \Delta t^2\right] < x_{i,j}(t) - x_{i-1,\overline{j+1}}(t) \end{cases} \quad (2)$$

where $\alpha_{i,j}(t)$, $v_{i,j}(t)$, and $x_{i,j}(t)$ denote an acceleration, a speed, and a position of the target vehicle j on the lane i at the moment t, respectively; $\alpha t_{i-1,\overline{j-1}}(t)$ and $v_{i-1,\overline{j-1}}(t)$ denote an acceleration and a speed of the left front vehicle $\overline{j-1}$ of the target vehicle j on the left lane i−1 at the moment t, respectively; $a_{i-1,\overline{j+1}}(t)$, $v_{1-1,\overline{j+1}}(t)$ and $x_{1-1,\overline{j+1}}(t)$ denote an acceleration, a speed and the position of the left rear vehicle $\overline{j+1}$ of the target vehicle j on the left lane i−1 at the moment t, respectively; and Δt denotes a lane change time interval;

if an equation (3) holds, it indicates that the target vehicle j satisfies a free-type right lane change at the moment t, and a right lane change risk factor is set as $\alpha_r = \alpha_0$;

$$\begin{cases} \left[v_{i,j}(t) \cdot \Delta t + \frac{1}{2} a_{i,j}(t) \cdot \Delta t^2\right] - \left[v_{i+1,\underline{j-1}}(t) \cdot \Delta t + \frac{1}{2} a_{i+1,\underline{j-1}}(t) \cdot \Delta t^2\right] \\ \qquad < x_{i+1,\underline{j-1}}(t) - x_{i,j}(t) \\ \left[v_{i+1,\underline{j+1}}(t) \cdot \Delta t + \frac{1}{2} a_{i+1,\underline{j+1}}(t) \cdot \Delta t^2\right] - \left[v_{i,j}(t) \cdot \Delta t + \frac{1}{2} a_{i,j}(t) \cdot \Delta t^2\right] \\ \qquad < x_{i,j}(t) - x_{i+1,\underline{j+1}}(t) \end{cases} \quad (3)$$

where $a_{i+1,\underline{j-1}}(t)$ and $v_{i+1,\underline{j-1}}(t)$ denote an acceleration and a speed of the right front vehicle $\underline{j-1}$ of the target vehicle j on the right lane i+1 at the moment t, respectively; $a_{i+1,\underline{j+1}}(t)$, $v_{i+1,\underline{j+1}}(t)$, and $x_{i+1,\underline{j+1}}(t)$ denote an acceleration, a speed, and a position of the right rear vehicle $\underline{j+1}$ of the target vehicle j the right lane i+1 at the moment t; and if an equation (4) holds, it indicates that the target vehicle j satisfies a low-risk type left lane change at the moment t, and the left lane change risk factor is $\alpha_l = \alpha_1$, wherein $\alpha_1$ is a constant and $\alpha_0 < \alpha_1$;

$$\begin{cases} \left[v_{i,j}(t)\cdot\Delta t + \frac{1}{2}a_{i,j}(t)\cdot\Delta t^2\right] - \left[v_{i-1,\overline{j-1}}(t)\cdot\Delta t + \frac{1}{2}a_{i-1,\overline{j-1}}(t)\cdot\Delta t^2\right] \\ \qquad > x_{i-1,\overline{j-1}}(t) - x_{i,j}(t) \\ \left[v_{i-1,\overline{j+1}}(t)\cdot\Delta t + \frac{1}{2}a_{i-1,\overline{j+1}}(t)\cdot\Delta t^2\right] - \left[v_{i,j}(t)\cdot\Delta t + \frac{1}{2}a_{i,j}(t)\cdot\Delta t^2\right] \\ \qquad < x_{i,j}(t) - x_{i-1,\overline{j+1}}(t) \end{cases} \quad (4)$$

if an equation (5) holds, it indicates that the target vehicle j satisfies a low-risk type right lane change at the moment t, and the right lane change risk factor is set as $\alpha_r = \alpha_1$;

$$\begin{cases} \left[v_{i,j}(t)\cdot\Delta t + \frac{1}{2}a_{i,j}(t)\cdot\Delta t^2\right] - \left[v_{i+1,\underline{j-1}}(t)\cdot\Delta t + \frac{1}{2}a_{i+1,\underline{j-1}}(t)\cdot\Delta t^2\right] > x_{i+1,\underline{j-1}}(t) - x_{i,j}(t) \\ \left[v_{i+1,\underline{j+1}}(t)\cdot\Delta t + \frac{1}{2}a_{i+1,\underline{j+1}}(t)\cdot\Delta t^2\right] - \left[v_{i,j}(t)\cdot\Delta t + \frac{1}{2}a_{i,j}(t)\cdot\Delta t^2\right] < x_{i,j}(t) - x_{i+1,\underline{j+1}}(t) \end{cases} \quad (5)$$

if an equation (6) holds, it indicates that the target vehicle j satisfies a medium-risk type left lane change at the moment t, and the left lane change risk factor is set as $\alpha_l = \alpha_2$, wherein $\alpha_2$ is a constant, and $\alpha_1 < \alpha_2$;

$$\begin{cases} \left[v_{i,j}(t)\cdot\Delta t + \frac{1}{2}a_{i,j}(t)\cdot\Delta t^2\right] - \left[v_{i-1,\overline{j-1}}(t)\cdot\Delta t + \frac{1}{2}a_{i-1,\overline{j-1}}(t)\cdot\Delta t^2\right] < x_{i-1,\overline{j-1}}(t) - x_{i,j}(t) \\ \left[v_{i-1,\overline{j+1}}(t)\cdot\Delta t + \frac{1}{2}a_{i-1,\overline{j+1}}(t)\cdot\Delta t^2\right] - \left[v_{i,j}(t)\cdot\Delta t + \frac{1}{2}a_{i,j}(t)\cdot\Delta t^2\right] > x_{i,j}(t) - x_{i-1,\overline{j+1}}(t) \end{cases} \quad (6)$$

if an equation (7) holds, it indicates that the target vehicle j satisfies a medium-risk type right lane change at the moment t, and the right lane change risk factor is set as $\alpha_r = a_2$;

$$\begin{cases} \left[v_{i,j}(t)\cdot\Delta t + \frac{1}{2}a_{i,j}(t)\cdot\Delta t^2\right] - \left[v_{i+1,\underline{j-1}}(t)\cdot\Delta t + \frac{1}{2}a_{i+1,\underline{j-1}}(t)\cdot\Delta t^2\right] < x_{i+1,\underline{j-1}}(t) - x_{i,j}(t) \\ \left[v_{i+1,\underline{j+1}}(t)\cdot\Delta t + \frac{1}{2}a_{i+1,\underline{j+1}}(t)\cdot\Delta t^2\right] - \left[v_{i,j}(t)\cdot\Delta t + \frac{1}{2}a_{i,j}(t)\cdot\Delta t^2\right] > x_{i,j}(t) - x_{i+1,\underline{j+1}}(t) \end{cases} \quad (7)$$

if an equation (8) holds, it indicates that the target vehicle j does not satisfy a left lane change requirement at the moment t, and the left lane change risk factor is set as $\alpha_l = \alpha_3$, wherein $\alpha_3$ is a constant and $\alpha_2 < \alpha_3$; and $$\begin{cases} \left[v_{i,j}(t)\cdot\Delta t + \frac{1}{2}a_{i,j}(t)\cdot\Delta t^2\right] - \left[v_{i-1,\overline{j-1}}(t)\cdot\Delta t + \frac{1}{2}a_{i-1,\overline{j-1}}(t)\cdot\Delta t^2\right] > x_{i-1,\overline{j-1}}(t) - x_{i,j}(t) \\ \left[v_{i-1,\overline{j+1}}(t)\cdot\Delta t + \frac{1}{2}a_{i-1,\overline{j+1}}(t)\cdot\Delta t^2\right] - \left[v_{i,j}(t)\cdot\Delta t + \frac{1}{2}a_{i,j}(t)\cdot\Delta t^2\right] > x_{i,j}(t) - x_{i-1,\overline{j+1}}(t) \end{cases} \quad (8)$$

if an equation (9) holds, it indicates that the target vehicle j does not satisfy a right lane change requirement at the moment t, and the right lane change risk factor is set as $\alpha_r = \alpha_3$;

$$\begin{cases} \left[v_{i,j}(t)\cdot\Delta t + \frac{1}{2}a_{i,j}(t)\cdot\Delta t\right] - \left[v_{i+1,\underline{j-1}}(t)\cdot\Delta t + \frac{1}{2}a_{i+1,\underline{j-1}}(t)\cdot\Delta t\right] > x_{i+1,\underline{j-1}}(t) - x_{i,j}(t) \\ \left[v_{i+1,\underline{j+1}}(t)\cdot\Delta t + \frac{1}{2}a_{i+1,\underline{j+1}}(t)\cdot\Delta t\right] - \left[v_{i,j}(t)\cdot\Delta t + \frac{1}{2}a_{i,j}(t)\cdot\Delta t\right] > x_{i,j}(t) - x_{i+1,\underline{j+1}}(t) \end{cases} \quad (9)$$

step 6, determining whether the left lane change risk factor and the right lane change risk factor determined in the step 5 satisfy an equation (10), in response to a determination that the left lane change risk factor and the right lane change risk factor satisfy the equation (10), proceeding to step 7; and in response to a determination that the left lane change risk factor and the right lane change risk factor do not satisfy the equation (10), proceeding to the step 8;

$$\alpha_l = \Delta_r < \alpha_3 \quad (10)$$

step 7, calculating a left lane change direction factor $\beta_l$ and a right lane change direction factor $\beta_r$ using an equation (11), when $\beta_l > \beta_r$, the target vehicle j performing a left lane change and ending process at the moment t; when $\beta_l < \beta_r$, the target vehicle j performing a right lane change and ending the process at the moment t;

$$\begin{cases} \beta_l = \dfrac{x_{i,j}(t) - x_{i-1,\overline{j+1}}(t)}{x_{i-1,\overline{j-1}}(t) - x_{i-1,\overline{j+1}}(t)} \\ \beta_r = \dfrac{x_{i,j}(t) - x_{i+1,\overline{j+1}}(t)}{x_{i+1,\underline{j-1}}(t) - x_{i+1,\underline{j+1}}(t)} \end{cases} \quad (11)$$

step 8, when $\alpha_l > \alpha_r$, the target vehicle j performing the right lane change and ending the process at the moment t; when $\alpha_l < \alpha_r$, the target vehicle j performing the left lane change and ending the process at the moment t; and when $\alpha_l = \alpha_r = \alpha_3$, performing step 13;

step 9, when the target vehicle j is on the left lane or the right lane at the moment t, collecting intervals between the target vehicle j and the front vehicle and the rear vehicle on the lane that is switching into at the moment t to determine whether the target vehicle j performs a lane changing operation at the moment t;

step 9.1, when the target vehicle j is on the left lane at the moment t, in response to that an equation (12) holds, then the target vehicle j performing the right lane change and ending the process at the moment t; otherwise, performing step 13;

$$\Delta_r < \alpha_3 \quad (12)$$

step 9.2, when the target vehicle j is on the right lane at the moment t, in response to that an equation (13) holds, then the target vehicle j performing the left lane change and ending the process; otherwise, performing step 13;

$$\alpha_l < \alpha_3 \quad (13)$$

step 10, when the target vehicle j is in the diversion zone at the moment t, determining whether the target vehicle j needs to drive away from the diversion zone; when the target vehicle j needs to drive away from the diversion zone, proceeding to step 11; otherwise proceeding to step 12;

step 11, when the diversion zone is located on the leftmost side of the vehicular travel direction of the target vehicle j, calculating $\alpha_l$ according to the step 5, and then determining whether the equation (13) holds; in response to that the equation (13) holds, the target vehicle j performing the left lane change and ending the process at the moment t; otherwise, performing step 14;

when the diversion zone is located at the rightmost side of the vehicular travel direction of the target vehicle j, calculating $\alpha_r$ according to the step 5, and then determining whether the equation (12) holds; in response to that the equation (12) holds, then the target vehicle j performing the right lane change and ending the process at the moment t; otherwise, performing step 14;

step 12, if the target vehicle j does not need to drive away from the diversion zone at the moment t, returning to the step 3 and executing in sequence;

step 13, after assigning t+Δt to t, returning to the step 2 and executing in sequence; and step 14, after assigning t+Δt to t, in response to that an equation (14) holds, returning to the step 2 and executing in sequence; otherwise, the target vehicle j performing a forced lane change at the moment t, which refers to vehicles affecting steering of the target vehicle j at the moment t adjusting their own speeds to force the target vehicle j to change into the diversion zone;

$$x_j(t+\Delta t) > x_{min} \quad (14)$$

wherein $x_1(t+\Delta t)$ denotes the position of the target vehicle j at moment t+Δt, and $x_{min}$ denotes a latest lane change position of the vehicle.

2. An electronic device comprising a memory and a processor, wherein the memory is configured to store a program for supporting the processor to execute the method of claim 1, and the processor is configured to execute the program stored in the memory.

3. A non-transitory computer-readable storage medium storing computer instructions, wherein when a computer reads the computer instructions in the storage medium, the computer performs the method of claim 1.

\* \* \* \* \*